INVENTOR.
David R. Peterson
BY
Mueller & Aichele
ATTY'S.

May 12, 1970 D. R. PETERSON 3,511,703

METHOD FOR DEPOSITING MIXED OXIDE FILMS CONTAINING ALUMINUM OXIDE

Original Filed March 9, 1967 2 Sheets-Sheet 2

INVENTOR.
David R. Peterson
BY
Mueller & Aichele
ATTY'S.

United States Patent Office 3,511,703
Patented May 12, 1970

3,511,703
METHOD FOR DEPOSITING MIXED OXIDE FILMS CONTAINING ALUMINUM OXIDE

David R. Peterson, Menlo Park, Calif., assignor to Motorola, Inc., Franklin Park, Ill., a corporation of Illinois Continuation of application Ser. No. 648,175, Mar. 9, 1967, which is a continuation-in-part of application Ser. No. 310,257, Sept. 20, 1963. This application Dec. 12, 1968, Ser. No. 785,047
Int. Cl. H01b 3/10
U.S. Cl. 117—213 12 Claims

ABSTRACT OF THE DISCLOSURE

A process for coating a solid substrate by the vapor phase deposition of aluminum oxide, alone or in combination with other oxides, including silica, boria and titania. The aluminum oxide coating is formed by the oxidation of an aluminum alkyl, while the other oxides are obtained from the corresponding alkoxides or alcoholates. The primary application of the technique is in the protective dielectric coating of solid state devices such as transistors and integrated circuits.

Figure 1:
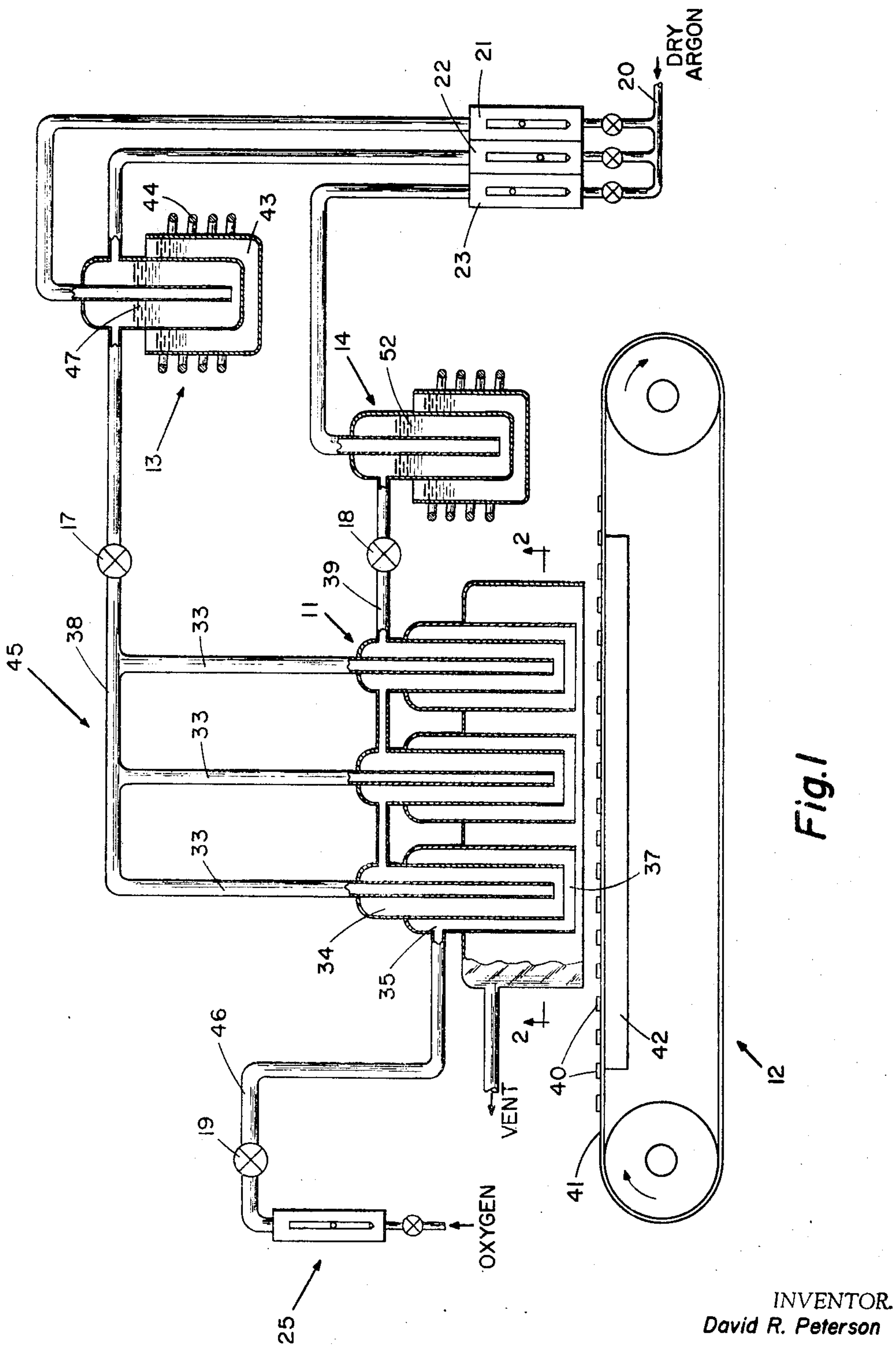

This application is a continuation of my copending application, Ser. No. 648,175, filed Mar. 9, 1967, Method for Depositing Oxide Films (now abandoned). Ser. No. 648,175 is a continuation-in-part of U.S. Ser. No. 310,-257, now abandoned, filed Sept. 20, 1963.

BACKGROUND

This invention relates to the vapor deposition of vitreous thin films. In particular, the invention relates to reactive vapor phase deposition of pure and mixed aluminum oxide films by the oxidation of aluminum alkyls and also to their use as protective dielectric materials in the manufacture of solid state devices such as transistors and integrated circuits.

Since most vitreous metallic oxide films have good dielectric properties, they are of interest to the electronics industry. In the manufacture of miniature circuits, a common application of thin films of this type would be as an insulating material between the plates of thin film capacitors and between other conductive materials.

The semiconductor device industry uses thin oxide films for a variety of purposes, one of the more important being the protection of critical regions of transistors and diodes from the effect of operating environments which often have a degrading effect on the stability and reliability of such devices. Silicon dioxide and mixed oxides containing silicon are primarily used, largely because they can be conveniently prepared, but other oxides may be used.

The manner in which an oxide film is prepared is often as important as the quality of the oxide itself. Many of the processes used to form metallic oxides require that the substrate material on which the oxide is to be formed be maintained at a high temperature, e.g., the thermal oxidation of silicon in the preparation of planar transistors is usually done at 1000–1200° C. This tends to limit the process to substrates not adversely affected by these temperatures, and, of course, to substrates not having other structures and materials thereon which might be damaged by these temperatures.

There are lower temperature processes such as that described in U.S. Pat. 3,306,768 to David R. Peterson. That process is a hydrolytic one and while entirely satisfactory for most purposes, the ions left in and on the film during the reaction limit somewhat the electrical stability and maximum resistivity of the film. This is true of most hydrolytic and other oxide depositing procedures in which ionization is involved.

The description of thin oxide films by vacuum evaporation does not necessarily require a hot substrate. However, it is often not possible to deposit pure films in their highest oxidation states. This is due to chemical reactions taking place at high evaporation temperatures between the oxide being evaporated, the material of the heater used to vaporize it, and residual gases in the vacuum chamber. The oxide may also decompose to a lower oxidation state due to the fact that the oxygen pressure during evaporation may be lower than that at which the hot oxide can exist. Lower oxides when evaporated may react to some extent with residual oxygen or water vapor in the vacuum chamber resulting in a mixed oxide of varying composition. These oxides also tend to be contaminated by vacuum pump oil diffusing into the chamber. Perhaps the most serious objectional feature of evaporated oxide films for electronic use is that they almost always have too many pinhole discontinuities in them. These tiny openings are electrical leakage sites and allow contaminants to pass through the film. While such discontinuities are plentiful in evaporated thin films, they also occur to a moderate extent in the oxides used most frequently to protect silicon planar transistors and monolithic silicon integrated circuits. Such films are thermally grown by oxidizing the silicon. They are vitreous films of either pure silicon dioxide or they may be mixed glasses if formed in the presence of other materials, e.g., borosilicate glass may be formed by the oxidation of silicon in an environment containing boron compounds. The glasses will devitrify at various points and since crystalline oxides occupy less space than the same weight of vitreous oxides, the result is a discontinuity or "pinhole." Although these are extremely small, they constitute a very serious problem since the surfaces of the silicon devices protected by these glasses are usually quite sensitive, and the electrical parameters of many types of such devices are also quite sensitive to additional current leakage. Obviously, glass films which are pinhole free are to be preferred.

Pinhole discontinuities in oxides are generally objectionable wherever thin film components require the use of oxides having good insulation properties. Pinholes in an oxide film are almost always leaky electrically and must be adjusted for. In the preparation of thin film capacitors, it is necessary to burn away the electrode or plate material in the vicinity of the pinhole before the capacitors can be used. This is done by pulsing several hundred volts into the thin film capacitor in order that enough current will flow through the pinhole to burn away the metal of the plates at this point; this procedure lengthens the leakage path in most cases so that current losses are made small enough to be tolerable.

The majority of the thin film oxide deposition processes currently used in the production of electronics equipment such as transistors and integrated circuits either have noxious products associated with them and therefore require closed systems or are very slow in operation. In either case, substrates to be coated are usually treated in batches. The disadvantage of batch type procedures is that if a processing error occurs, the batch as a whole is affected so that where there is a simple choice, continuous processing (i.e., step-by-step processing on each substrate independently of the other substrates being processed) is to be preferred.

THE INVENTION

A principal object of this invention is to provide an improved method of depositing thin vitreous films for insulation, encapsulation and other purposes.

A further object of this invention is to provide a film deposition method suitable for use at moderate to low substrate temperatures.

Another object of this invention is to provide a method of depositing thin oxide films of high dielectric quality, high purity and which are relatively free of pinhole discontinuities.

Yet another object of the invention is to provide an improved film deposition method which is suitable for continuous type processing.

The invention features the use of a reaction of an aluminum alkyl and oxygen at the surface of a substrate to form a film of aluminum oxide on the surface.

Another feature of the invention is the use of the reaction between an aluminum alkyl and the alcoholates of various metals to form mixed metallic oxides.

An important feature of the invention is the use of the heat of reaction of the constituents to promote the reaction thereby permitting the use of moderate substrate temperatures.

DRAWINGS

Figure 2:
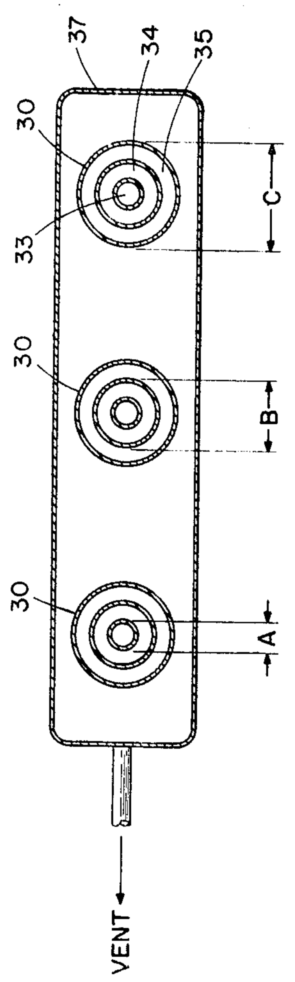

FIG. 1 is a schematic drawing of an apparatus which is an embodiment of this invention. The apparatus is for the deposition of pure aluminum oxide or mixed glass films containing aluminum oxide; and FIG. 2 is a section taken at line 2—2 to show the construction of the deposition head used in the apparatus of FIG. 1.

In accordance with this invention, films of aluminum oxide and mixed oxide films containing aluminum oxide may be caused to form on substrates of various kinds of materials. The word substrate as used in this specification refers to objects or combinations of objects, regardless of shape, on which the oxide films are to be deposited.

To deposit aluminum oxide, a substrate is moderately heated and exposed to an atmosphere containing oxygen and an aluminum alkyl. A reaction between oxygen and the alkyl occurs primarily on the substrate due to the catalyzing effect of the surface which deposits an adherent aluminum oxide film of excellent dielectric quality.

Mixed oxides may be formed by introducing alcoholates of the suitable metals into the oxygen-alkyl atmosphere. A mixture of triethyl aluminum and triethyl borate, for example, will produce films of $B_2O_3 \cdot Al_2O_3$ glass.

The accompanying drawings and the following text explain the invention in detail.

FIG. 1 is a schematic representation of a production type apparatus for continuous-process deposition of aluminum glass films in accordance with this invention. The apparatus is composed of a deposition head 11, a conveyor 12, a heated bubbler 13 for supplying aluminum alkyl vapor, another heated bubbler 14 for vaporizing an additional reactant where mixed oxide glasses are desired, shutoff valves 17, 18 and 19 and a source of argon or other inert gas with three rotometers 21, 22 and 23 to provide a carrier gas to move the reactants to the deposition head. There is also a rotometer-equipped oxygen source at 25 connected to the deposition head. Oxygen from the atmosphere is also available to enter the reaction, since no means is provided to exclude it.

FIG. 2 is a sectional view of the deposition head. It has three mixing units 30 in this embodiment, but more or fewer may be used. These mixing units are each made up of three coaxial tubes. The central tube carries the flow of triethyl aluminum or other aluminum alkyl, the next tube carries a metal alcoholate and the other tube carries oxygen. The surrounding hood minimizes loss of gas and vapor to the environment about the conveyor.

The deposition procedure for a pure aluminum oxide film is as follows. Clean substrates 40 are placed upon the moving belt 41 of the conveyor 12 and are transported first onto the substrate heater 42 where they are brought to the temperature required for the deposition and then beneath the deposition head 11 where the glass is deposited.

The exit ends of the coaxial tubes 33, 34 and 35 of the mixing units of the deposition head are near the substrates. The path of each substrate is through the center beneath each unit. The space 37 between the tube ends and the substrate and belt serves as a mixing chamber for the vapors and gases. The deposition head and its component mixing units, and tubes 38 and 39 leading from the bubblers, are heated slightly to prevent condensation on the walls. This heating system is non-critical and is not shown. Deposition data given in the specification were collected from a prototype apparatus similar to FIG. 1 having the following deposition head dimensions. Center tube diameter was one-half inch, intermediate tube diameter was three-fourths inch, outer tube diameter was one and one-half inches and the substrate to center tube distance was one-fourth inch to one inch.

For the preparation of a pure aluminum oxide film, the bubbler 14 is not used and the rotometer 23 and valve 18 are turned off. The oil bath 43 surrounding the bubbler 13 is heated by the coils 44 to a temperature sufficiently high to assure vaporization of the alkyl 47 while argon is bubbled through it. The rotometer 21 controls the flow of argon bubbled through the alkyl. Uniform high dilutions are facilitated by argon controlled by the rotometer 22 and supplied to the top portion of the bubbler which mixes and dilutes the vapor formed by the bubbling.

The alkyl-argon mixture is carried to the manifold 45 and down the central tubes 33 of the mixing units. Oxygen introduced through line 46 mixes with the alkyl in the region 37. Before a molecule of the alkyl can react with an oxygen molecule to form $Al_2O_3$, a collision between the molecules is required. Both the alkyl and the oxygen tend to be adsorbed on the surface of the substrate 40 so that the concentration of reactants will be many orders of magnitude greater than in the surrounding atmosphere. For this reason, the reaction occurs preferentially at the surface of the heated substrate due to the greatly increased probability of collision, and very little reaction occurs in the space beween the alkyl outlet and the substrate.

The oxide-forming reaction occurring at the surface of the substrate is between the aluminum alkyl and the oxygen to form aluminum oxide and certain other reaction products. The aluminum alkyls contain a carbon-aluminum bond which is very weak and the carbon is readily replaced with oxygen forming a very stable oxygen-aluminum bond. Alkyls are thus vigorously reactive with oxygen; they will, for example, ignite spontaneously with air. This high chemical activity makes them especially useful for vapor plating. By reacting the vapor of an alkyl with an oxygen-containing ambient, the aluminum alkyl is readily oxidized to $Al_2O_3$. Reaction by-products are volatile, comprised principally of organic materials and water. The water also reacts with the alkyl to yield $Al_2O_3$.

Typically, the reaction is as follows in the unbalanced equations below:

$$Al(R)_3+O_2 \rightarrow Al_2O_3+H_2O+CO_2$$

where R is the alkyl radical $C_nH_{2n+1}$. The water formed in this reaction also reacts with the alkyl and aids in the reaction $$Al(R)_3+H_2O \rightarrow ROH+Al_2O_3 \cdot xH_2O$$

From the above equations, it is apparent that a minimum of about 2.6 mols of $O_2$ are required for each mol of aluminum alkyl, where the alkyl group (R) is methyl. Where R is ethyl, at least 3.0 mols of $O_2$ are needed per mol of aluminum alkyl. The $O_2$ requirement increases for the higher alkyls. These minimum oxygen requirements are based on an assumption that substantially all available $H_2O$ is consumed in the reaction indicated by the second equation, i.e., that the amount of water of hydration in the final oxide product is very small or negligible. At the higher processing temperatures, this is a reasonable assumption. If significant water of hydration remained, the $O_2$ requirement would be slightly higher.

Using triethyl aluminum and oxygen to deposit an aluminum oxide film $Al_2O_3$, the following data are typical. The triethyl aluminum is maintained at a temperature of 60° C. with a flow of argon through the bubbler of 140 milliliters per minute and an oxygen flow of 100 milliliters per minute. The substrate is maintained at a temperature of 350° C. Deposition beneath each of the three mixing units proceeds at a rate of about 300 angstrom units thickness per minute. At a given substrate temperature, the deposition rate depends primarily on the flow rates and the temperature at which the alkyl is maintained.

The alkyls may be reacted with various oxygen containing compounds other than water to form mixed oxides of aluminum with other metals. A mixed glass is formed, for example, when aluminum alkyl is caused to react with tetraethyl orthosilicate, and a number of other reactions are possible to form mixed glasses. The alcoholates or alkoxides of metals are very well suited for this purpose since their reaction products with the alkyls are volatile. The alcoholates triethyl borate, ethyl plumbate, and tetraisopropyl titanate form satisfactory mixed glasses in reaction with triethyl aluminum and trimethyl aluminum.

The procedure for depositing mixed glass films differs primarily in the fact that a reactant such as a metallic alcoholate is introduced into the mixing chambers of the deposition head. The oxygen may be metered or cut off, if desired, since sufficient oxygen is frequently available from exposure to the atmosphere. Bubbling argon or other inert carirer gas through a bubbler 14 containing alcoholate 52 while heating the bubbler slightly, vaporizes the alcoholate which is then carried into the mixing chambers by the argon. A reaction between the alkyl and the alcoholate and the oxygen produces the mixed film on the surface of the substrate. This, too, is primarily a surface reaction due to adsorption and the increased concentration of reactants resulting therefrom.

A film of mixed glass, which is of importance to the semiconductor industry, since it may be deposited on semiconductors such as silicon and heated to rather high temperatures with little effect on the silicon is the mixed glass of aluminum and silicon formed when triethyl aluminum is caused to react with tetraethyl orthosilicate on a substrate heated to a temperature between 300° to 350° C.

The high energy content of the aluminum alkyl, e.g., triethyl aluminum which has a total enthalpy of 20,160 b.t.u./lb. at 25° C., drives the reaction to completion and provides the energy to cause the deposited atoms to form a tight, dense, well-bonded, strain-free, glass network.

The ratio of alumina to silica in mixed glass found most useful is about 4:1. The resulting glass, prepared as will be described, is excellent in every respect. Its electrical and physical properties, as will be shown later, are most unique providing many advantages to the electrical and semiconductor device engineer.

In general, the deposition technique for these mixed glass films and the equipment utilized, differs only slightly from the deposition technique of the pure aluminum oxide. Because of its particular utility, the following discussion will apply in detail to the deposition of aluminum-silicon glasses and only generally to other mixed glasses although they are prepared with the same apparatus.

The rate of reaction of a given reaction will depend primarily upon (1) the concentration of reactants and products, and (2) the temperature at the reaction zone. In order to control these parameters (1) and (2), the reactant materials are contained in a bubble-type vaporizer held at a constant temperature by means of a regulated oil bath. An inert carrier gas is metered and bubbled through the vaporizer where it is saturated with the reactant. Two or more such streams carrying the reactants are then allowed to mix above the substrate which is maintained at the appropriate reaction temperature by a regulated heating element.

FIG. 1 as previously noted is illustrative of the equipment used in the production of alumina-silica films using triethyl aluminum and tetraethyl orthosilicate as the reactive materials. Typical operating conditions are a triethyl aluminum temperature of 60° C., a tetraethyl orthosilicate temperature of 25° C., a flow of .02 cubic foot per minute through the triethyl aluminum vaporizer and .009 cubic foot per minute through the tetraethyl orthosilicate vaporizer, and a substrate temperature preferably less than 350° C., for example, 300° C. Under these conditions deposition proceeds at a rate of 100 angstrom units per minute beneath each of the three mixing units with an Al to Si ratio in the deposited film of 4:1. Appropriate adjustment of flow rates and vaporizer temperature permits varying speed of deposition and composition of the resultant film. Films of over 50,000 angstrom units in thickness are readily prepared by simply increasing the exposure time of the substrate to the reactants.

The film as deposited is shown by X-ray diffraction studies to be amorphous. It is continuous and pinhole-free as shown by its application as a thoroughly satisfactory insulating barrier in tunnel emission and field effect devices and by the fact that it may be used in the preparation of evaporated aluminum thin film capacitors without subsequent electrical pulsing to cure the capacitor. Its excellent properties are attributed, in part, to the heat of reaction available to aid the formation of the glass network.

The $Al_2O_3 \cdot SiO_2$ films prepared by this technique have shown good resistance to mechanical damage. Films are not scratched by steel but are not as hard as silicon carbide. A mixed glass provides a higher coefficient of thermal expansion than does a quartz (vitreous $SiO_2$) film resulting in a closer fit to the expansion rate of most metals and semiconductors. It is easy to fabricate thick films of mixed glasses (or $Al_2O_3$) using this invention. Films of over five microns in thickness are rapidly and routinely fabricated. One application of a fairly thick 50,000 angstrom deposit of 4:1 aluminum silicon glass is in the preparation of a thin film Nichrome strain gage. The durability of such films is excellent. During test, samples were strained through 5,000 micron inches per inch without failure. The films were tested after being deposited on stainless steel; they were strain cycled at least six times through 5,000 micro-inches per inch and temperature cycled five times over a range of 500° C. without failure, loss of adherence, or crazing of the dielectric. Films of over 30,000 angstrom units in thickness deposited on single crystal silicon have withstood repeated cycling of from 25° C. to 1000° C. Since the coefficient of linear expansion of silicon is $7 \times 10^{-6}$ and that of the particular stainless steel used is $18 \times 10^{-6}$, it is apparent that the $Al_2O_3 \cdot SiO_2$ films are compatible with materials having a rather wide range of expansion rates.

Chemically these films are unaffected by strong bases or acid other than hydrofluoric acid and are inert to boiling water and steam.

The film electrical properties of the 4:1 aluminum silicon glass have been evaluated by measurements performed on capacitors using this glass as the dielectric. The dielectric constant lies between five and six, the dielectric strength is between 7 and $9 \times 10^6$ volts per centimeter and the volume resistivity is in the range of $7 \times 10^{16}$ to $8 \times 10^{16}$ ohm-centimeter.

Another indication of the stability of these films may be obtained from accelerated aging tests of capacitors fabricated from them. For example, 13,000 unit hours of life testing at 125° C. and 22 volts DC load were completed on capacitors possessing aluminum electrodes with no units failing and a maximum capacitance change of —1.9 percent. Other capacitors held under test at 95 percent relative humidity have now accumulated 15,000 unit hours of test time with no failures and an average capacitance change of one percent.

The electrical properties of these films rival those of quartz and their thermal expansion properties are well suited for encapsulating silicon and perhaps other semiconductor substrates. The compatibility of the deposition environment with semiconducting and thin film element components, coupled with the ease of deposition, the chemical stability and physical stability, definitely include them as a most useful passivating and stabilizing encapsulant for semiconductor integrated circuits, transistors and similar devices.

The thermally grown oxides used in the preparation of planar passivated transistors are left in position over the surface regions of these devices to act as a stabilizing and protective encapsulant. Since the oxides devitrify forming occasional pinholes, the films have leaks which expose the surface to the ambient atmosphere with consequent degradation of the device in most cases. These pinholes are readily sealed by forming an aluminum-silicon glass over the thermally grown oxides. The value of this procedure has been thoroughly demonstrated.

In the preparation of a particular type of silicon planar passivated transistor under controlled laboratory conditions, the number of transistors meeting specifications was 30%; the majority of the rejects being due to device instability. The same kind of devices given an additional encapsulating coating of oxide by the reaction of triethyl aluminum and tetraethyl orthosilicate showed a marked improvement. Over 60% of the devices met specifications and of the devices rejected very few were unstable.

Further experiments show that these encapsulated devices were able to stand high temperature environments that destroyed the unencapsulated transistors. Encapsulated planar transistors of the type tested were able to stand temperatures almost one hundred degrees centigrade higher than the temperatures at which the unencapsulated transistors failed.

The reduction in the number of transistors lost in fabrication as well as the improvement in their ability to withstand higher temperatures appears to be related to the manner in which the aluminum-silicon glass film is applied. A number of other deposition procedures for forming aluminum-silicon glasses from halides were evaluated and were not satisfactory for this purpose. The percentage of reject planar passivated transistors was increased as a rule and many good devices were made completely inoperable as a result of the deposition of the films from the halides.

The passivating glass coating on the typical planar transistors consists of layers such as borosilicate glass, phosphosilicate glass and silica. These glasses extend from the surface of the silicon at various places in such a manner as to bound one another at the physical surface of the silicon. The boundaries, though somewhat diffuse, are regions of considerable mechanical strain due to the mismatch in thermal expansion coefficients of these glasses. This tends to cause devitrification sites at which pinholes occur, and where these strained regions occur at or near PN junction boundaries, the quality of the junction is degraded somewhat even in the absence of pinholes. For this reason, a substantial advantage is to be gained by stripping the various oxides from planar transistors, diodes, and similarly constructed devices, and then recovering the critical surfaces of the devices with a film of alumina-silica glass or other suitable glass using the method of this invention.

Depending on the type of device, the stripping and recovering operation may be performed just after all solid state diffusion steps are completed or after assembly of the semiconductor element on its mount, e.g., a header. The oxides are readily stripped by exposure for a short period of time to hydrogen fluoride vapor after which a film of the appropriate thickness is deposited.

In one application, the preparation of integrated circuits, all diffusion steps are completed, the old oxides are stripped, and alumina-silica glass is deposited. From this point on, processing in most cases may continue in the same manner as if the old oxides had been left on. In other applications as in the preparation of rather large planar transistor, the transistor may be almost completely assembled including electrical connection to a header before exposure to hydrogen fluoride and alumina-silica deposition steps. The devices compatible with this manner of processing are those having metal contacts and parts which are not appreciably attacked during the short exposure to hydrogen fluoride vapor. Prior to the deposition of the alumina-silica film, it is, of course, necessary to mask off those portions of the header where subsequent electrical connection is to be made. It may also be useful to eliminate the header and simply "pot" the glass-passivated device with a suitable encapsulant. For example, plastic or another glass such as "Pyrex" may be applied over the mixed or pure alumina glass for "potting" purposes.

A mixed oxide glass film comprising three or more oxides may also be formed in accordance with the process of the invention. For example, a boroalumina-silicate glass (boria-alumina-silica) may be deposited on any of the above-mentioned substrates by exposure to a gaseous mixture containing an aluminum alkyl, an alkyl orthosilicate, an alkyl borate, and oxygen. The oxygen provided by concurrent exposure of the substrate to the atmosphere is generally sufficient.

A gaseous mixture comprising tetraethyl orthosilicate, triethyl borate and triethyl aluminum metered in controlled amounts calculated to yield silica, boria, and alumina in a molar ratio of 5:5:1, respectively, is a preferred example of a three component charge to be passed in contact with a substrate held at a temperature of 25° to 400° C., with concurrent exposure to the atmosphere as a source of oxygen.

As an encapsulating coating, the process has excellent properties inasmuch as it has unusually good throwing power. Since this is not a vacuum deposition method, the mean free path of the molecules is very short and therefore all but the most hidden surfaces are readily plated. For this reason, it also has proven to be quite useful in protecting electronic devices such as circuits having wired and variously shaped components from the action of deleterious ambient atmospheres without further encapsulation.

With respect to film deposition in accordance with this invention, the most satisfactory aluminum alkyls are trimethyl aluminum and triethyl aluminum, although triisobutyl aluminum may also be used. As the alkyls become heavier, the size of the organic group that is attached to the aluminum is larger and relatively heavier. The reaction product is less volatile in this case and special methods must be employed to prevent carbon deposits on the films. For alkyls larger than the triisobutyl, it becomes necessary to work under a partially reduced pressure at the substrate in order to promote vaporization of these organic products. It has also been experimentally established that the dielectric strength of thin aluminum oxide films formed from triisobutyl aluminum and larger alkyls are inferior (10 volts per 1000 angstrom units in thickness) to those formed using triethyl aluminum and trimethyl aluminum which are quite high (50 volts per 1000 angstrom units in thickness). There is little difference in the dielectric strength between the films deposited from the trimethyl aluminum and the triethyl aluminum.

The significant difference between the use of the trimethyl aluminum and the triethyl aluminum is the rate of film growth. Trimethyl aluminum allows deposition at a reasonable rate (300 angstrom units per minute) at substrate temperatures of 100° C. or less while the rate using triethyl aluminum is rather slow. Aluminum oxide and the various aluminum oxide bearing glasses described herein have been deposited in accordance with the invention at temperatures as low as 25° C. The rate of deposition is very slow, however, regardless of the aluminum alkyl used.

As is apparent, the invention described is a method for depositing films of aluminum oxide and aluminum-bearing glasses at moderate temperatures in a manner such that the films are continuous and have excellent dielectric and encapsulant qualities. The method is simple, convenient, inexpensive, does not form noxious reaction products, and is well-suited for continuous production-type film deposition.

I claim:

1. A process for stabilizing a semiconductor electronic structure with a mixed oxide film which comprises exposing the structure to a gaseous mixture including an aluminum alkyl, a metal alcoholate and oxygen, while concurrently maintaining said substrate at a temperature of at least 25° C.

2. A process as defined by claim 1 wherein said temperature is between 25° C. and 350° C., and at least a substantial portion of said oxygen is provided by concurrently exposing said substrate to the atmosphere.

3. A process as defined by claim 1 wherein said aluminum alkyl is selected from the group consisting of trimethyl aluminum, triethyl aluminum and triisobutyl aluminum.

4. A process as defined by claim 1 wherein said gaseous mixture contains at least one alcoholate selected from the group consisting of tetraethyl orthosilicate, triethyl borate and isopropyl titanate.

5. A process as defined by claim 1 wherein the amount of oxygen in said gaseous mixture is sufficient to substantially completely convert the aluminum of said aluminum alkyl to aluminum oxide, and to substantially completely convert the metal of said alcoholate to its oxide form.

6. A process for coating a substrate with a mixed oxide film which comprises exposing the substrate to a gaseous mixture including an aluminum alkyl, an alkyl orthosilicate, an alkyl borate and oxygen, while concurrently maintaining said substrate at a temperature of at least 25° C.

7. A process as defined by claim 6 wherein said temperature is between 25° C. and 400° C., and said substrate is concurrently exposed to the atmosphere.

8. A process for stabilizing a semiconductor electronic structure having at least one oxide film thereon comprising the steps of stripping said oxide film from said structure and exposing said structure to a gaseous mixture including an aluminum alkyl, a metal alcoholate and oxygen, while concurrently maintaining said structure at a temperature of at least 25° C. for a time sufficient to coat said structure with a mixed oxide film.

9. A method as described in claim 8 wherein said structure is stripped of said oxide film by exposing said structure to hydrogen fluoride.

10. A process as defined by claim 8 wherein said temperature is between 25° C. and 350° C., and at least a substantial portion of said oxygen is provided by concurrently exposing said substrate to the atmosphere.

11. A process as defined by claim 8 wherein said aluminum alkyl is selected from the group consisting of trimethyl aluminum, triethyl aluminum and triisobutyl aluminum.

12. A process as defined by claim 8 wherein said gaseous mixture contains at least one alcoholate selected from the group consisting of tetraethyl orthosilicate, triethyl borate and isopropyl titanate.

References Cited

UNITED STATES PATENTS

| | | | |
|---|---|---|---|
| 2,762,115 | 9/1956 | Gates. | |
| 2,831,780 | 4/1958 | Deyrup. | |
| 2,847,320 | 8/1958 | Bulloff | 117—107.2 X |
| 2,881,566 | 4/1959 | Badger. | |
| 2,921,868 | 1/1960 | Berger | 117—107.2 |
| 2,972,555 | 2/1961 | Deutcher. | |
| 2,989,421 | 6/1961 | Novak. | |
| 2,990,295 | 6/1961 | Breining et al. | |
| 3,019,137 | 1/1962 | Hanlet. | |
| 3,243,363 | 3/1966 | Helwig. | |
| 3,335,038 | 8/1967 | Doo | 117—201 X |

ANDREW G. GOLIAN, Primary Examiner

U.S. Cl. X.R.

117—201, 106